US009480137B2

(12) United States Patent
Tierney et al.

(10) Patent No.: US 9,480,137 B2
(45) Date of Patent: Oct. 25, 2016

(54) ELECTROLYTIC CELL FOR HEATING ELECTROLYTE BY A GLOW PLASMA FIELD IN THE ELECTROLYTE

(71) Applicants: David Michael Tierney, Wyomissing, PA (US); Richard A. Hoffman, Sr., Harrisburg, PA (US); John E. Hoffman, Jr., Hummelstown, PA (US); James J. Pagliaro, II, Harrisburg, PA (US)

(72) Inventors: David Michael Tierney, Wyomissing, PA (US); Richard A. Hoffman, Sr., Harrisburg, PA (US); John E. Hoffman, Jr., Hummelstown, PA (US); James J. Pagliaro, II, Harrisburg, PA (US)

(73) Assignee: Corona Plasma Systems, Inc, Reading, PA (US)

( * ) Notice: Subject to any disclaimer, the term of this patent is extended or adjusted under 35 U.S.C. 154(b) by 0 days.

(21) Appl. No.: 14/304,444

(22) Filed: Jun. 13, 2014

(65) Prior Publication Data

US 2014/0360867 A1 Dec. 11, 2014

Related U.S. Application Data

(63) Continuation-in-part of application No. 13/397,807, filed on Feb. 16, 2012, now abandoned, which is a continuation-in-part of application No. PCT/US2010/036983, filed on Jun. 2, 2010.

(60) Provisional application No. 61/447,247, filed on Jul. 2, 2009.

(51) Int. Cl.

| | |
|---|---|
| ***H01M 8/243*** | (2016.01) |
| ***C25C 7/00*** | (2006.01) |
| ***C25C 7/02*** | (2006.01) |
| ***H05H 1/42*** | (2006.01) |
| ***H05H 1/24*** | (2006.01) |

(52) U.S. Cl.

CPC ............ *H05H 1/24* (2013.01); *H05H 1/2406* (2013.01); *H05H 2001/2418* (2013.01)

(58) Field of Classification Search

CPC .................... H01J 37/32055; H01J 2237/327; H01J 37/32064; H01J 37/32596; C25C 7/00; C25C 7/02; H01M 8/243; H05H 1/42; H05H 1/24

USPC .................................... 204/178, 192.38, 272

See application file for complete search history.

(56) References Cited

U.S. PATENT DOCUMENTS

| | | | |
|---|---|---|---|
| 5,427,747 | A | 6/1995 | Kong et al. |
| 5,626,726 | A | 5/1997 | Kong |

(Continued)

FOREIGN PATENT DOCUMENTS

| | | |
|---|---|---|
| JP | 2001-151507 A | 6/2001 |
| KR | 10-1999-14588 A | 2/1999 |
| KR | 10-2003-45435 A | 6/2003 |

OTHER PUBLICATIONS

Korean Patent Office, International Search Report in priority application PCT/US2010/036983, Dec. 20, 2010, 7 pages.

*Primary Examiner* — Zulmariam Mendez

(57) ABSTRACT

An apparatus and method for generating a Contact Glow Plasma Discharge in an electrolyte such as 7% $K_2CO_3$. A Shrouded Toroidal Anode is partially submerged in the electrolyte directly above a Flat Torus Cathode (totally submerged in the electrolyte), spaced approximately 50 mm apart, and the two electrodes are arranged in a concentric manner. A potential difference is applied from the cathode to the anode causing gas to be formed on the cathode. This is followed by a contact glow plasma being formed on the surface of the cathode and electromagnetically confined by a Spheromark formed by the configuration of the electrodes. This confinement of the plasma prevents a plasma arc from consuming the anode, which in turn allows for the application of 12,000 Watts and the occurrence of "non-linear electron resonance heating". The effects of nonlinear series resonance increase the total power dissipation by factors of 2-5 for low pressure capacitive plasmas. Thus explaining the 303% efficiency obtained with this apparatus.

13 Claims, 3 Drawing Sheets

(56) References Cited

U.S. PATENT DOCUMENTS

| | | | | |
|---|---|---|---|---|
| 6,361,663 | B1 * | 3/2002 | Berthold | C23C 14/325 204/192.38 |
| 6,471,932 | B1 | 10/2002 | Gleshoff et al. | |
| 2003/0101936 | A1 | 6/2003 | Lee | |
| 2005/0236376 | A1 | 10/2005 | Eccles | |
| 2008/0029030 | A1 | 2/2008 | Goto et al. | |

* cited by examiner

FIG. 1 CORONA PLASMA ELECTROLYTIC CELL

Corona Plasma Toroidal Anode

Corona Plasma Reactor Key Components Positioning

ELECTROLYTIC CELL FOR HEATING ELECTROLYTE BY A GLOW PLASMA FIELD IN THE ELECTROLYTE

RELATED APPLICATIONS

This application is a continuation-in-part of pending U.S. application Ser. No. 13/397,807 filed Feb. 16, 2012, which in turn is a continuation-in-part of Application No. PCT/US10/36983 filed Jun. 2, 2010, which in turn claims the benefit of U.S. Provisional Application No. 61/447,247 filed Feb. 28, 2011.

TECHNICAL FIELD

The present disclosure relates generally to electrolytic cells in which electrodes are in electrical contact with a liquid electrolyte. Specifically, the disclosure relates to an electrolytic cell for the generation of a plasma field in the electrolyte, and use of the electrolytic cell to generate heated electrolyte as a source of heat transfer.

BACKGROUND ART

Electrolytic cells that generate a plasma field in a liquid electrolyte are known. Such electrolytic cells are useful in different ways. First, they enable the study of the plasma field itself. Secondly, the electrolyte can be heated by the plasma field. The heated electrolyte can be circulated in a closed-loop or open-loop system as a heat source for space heating, industrial processes, or heat transfer.

A conventional electrolytic cell includes an aqueous electrolyte, such as a mixture of baking soda (sodium bicarbonate, NaHCO3) and water held in a tank. Electrodes consisting of a bare metal anode and a bare metal cathode are partially immersed in the electrolyte and connected to the terminals of a suitable power supply.

When the power supply is energized, a plasma field is generated adjacent the cathode (referred to herein as the "plasma electrode"). The plasma field is visible to the naked eye and can be described as an intense white glow, whose appearance is similar to the intense light given off by the mantle of a gas-fired camping lantern (the color of the glow can be affected by the chemical composition of the electrolyte). The term "plasma field" refers to this bright plasma field in the electrolyte.

The plasma field may be extinguished if the partially immersed plasma electrode is immersed too deeply into the electrolyte. It is theorized that as the surface area of the plasma electrode wetted by the electrolyte increases, the power density (the power transferred per unit area between the electrode surface to the electrolyte generating the plasma field) decreases. If the power density falls below a critical threshold, the plasma field is extinguished.

To maintain power density, the plasma electrode of a conventional electrolytic cell is partially immersed in the electrolyte and does not extend substantially beyond the electrolyte's upper surface.

As a result, the generated plasma field is also near the surface. This reduces the ability of the plasma field to efficiently heat deeper electrolyte. And because the plasma field is below the plasma electrode, heat from the plasma field and heated electrolyte impinge against the electrode, deteriorating or eroding the electrode. The plasma field cannot be maintained for an extended period and the plasma electrode requires frequent replacement, typically after only five or ten minutes of use.

Furthermore, it is difficult to control the output of the plasma field in a conventional electrolytic cell. If the energy output of the power supply is reduced, the plasma field may be extinguished. It is theorized that a minimum power density from the plasma electrode to the electrolyte is required to support the plasma field. If the power density falls below the threshold, the plasma field is extinguished.

Thus there is a need for an improved electrolytic cell to generate a plasma field in an electrolyte. The improved electrolytic cell should enable higher wattage loads without the subsequent anode erosion. The output of the plasma field should be controllable without reducing the power density between the plasma electrode and the electrolyte that could extinguish the plasma field. The plasma electrode should have a sufficiently long operating life before replacement is needed so as to enable the electrolytic cell to be a practical source of heated electrolyte for heating, industrial processes, and the like.

SUMMARY OF INVENTION

Preferred Embodiment

The present invention utilizes a Toroidal Anode 1 as the key element of a plasma confinement system including means for generating a Spheromark (easily formed, self-organized magnetized plasma configurations in the shape of a Torus), within a containment vessel identified as the Plasma Chamber 13 (or Tank 4 which is constructed of dielectric plastic), which comprises a plasma source with an anode 1 and a cathode 2 within the Plasma Chamber 13 and spaced apart 50 mm in a direction generally perpendicular to the magnetic lines of force of the plasma confinement system when an electric charge is applied between the Cathode 2 and Anode 1 The anode and cathode of the plasma source are arranged concentrically within the toroidal vessel with their axis coincident with the minor axis of the toroid. The anode 1 and cathode 2 each have a diameter of 76 mm, with the anode having a 10 mm Teflon shroud concealing the edge of the copper coil top 16 and bottom 17. Both electrodes are supported by Teflon machined structures. The purpose of the cathode Teflon structured 15 deals with spatial positioning in conjunction with the desired distance from the anode of 50 mm and vertically in a concentric manner to the anode (dead on center to center). The machined Teflon support for the anode 11 is more elaborate in design, but its functionality is rather simple: position and shrouding of the Toroid Anode and provide for the venting of the steam 10. The byproduct of this fuel cell is steam, which must be vented outside the plasma chamber because the plasma reaction of this design does not operate under pressure. Spatial positioning is of the utmost importance, so as to maintaining the plasma reaction on the surface of the cathode 2. The anode means and cathode means comprise concentric annular members, which are susceptible to the slightest disruption. For example, almost all aqueous plasma system require external source of gas to support the plasma reaction. In this instance, the addition of an external source of gas at the cathode proved disruptive to the positioning of the plasma on the cathode and in some cases causing electron runaway or torch effect on the anode. Hence in this embodiment there are no external sources of gas. The gas forms on the cathode being totally generated within the system. This is primarily possible because of the initial input of 12,000 W (300V & 40A). It is the design of the Toroid Anode which allows for this elevated level of electric current to be utilized without the consumption of the anode due to plasma arcing.

Technical Problem

Contact glow discharge electrolysis (CGDE) is a novel kind of electrochemical process in which plasma is sustained by DC or DC pulsed glow discharges between an electrode and the surface of surrounding electrolyte. The conventional normal electrolysis is developed into CGDE when the applied voltage is sufficiently high in aqueous media. A remarkable feature of CGDE is its high deviation of chemical yields at the glow discharge electrode from that expected on the basis of Faraday's law. The yields obtained at the glow discharge electrode are several times the faradaic value and the products novel for conventional electrolysis such as H2 can be generated at the anode, O2 at the cathode. The thermodynamic yield of CGDE in a solution has origin of two separate reaction zones: the liquid near the plasma-electrolyte interface and the plasma around the electrode, and this happened through dissociation of solvent and solute molecules by appropriate energy transfer process. There are a lot of radicals, ions and other active species produced via electron impact dissociation, excitation and ionization.

The support of the above description of Non-Linear Electron Resonance and to explain the anomalous heat generated in aqueous plasma reaction at atmospheric pressure the following Abstract of a peer reviewed Article is presented:

Nonlinear Plasma Dynamics in Capacitive Radio Frequency Discharges

Thomas Mussenbrock and Ralf Peter Brinkmann Published 17 Apr. 2007 •2007 IOP Publishing Ltd•Plasma Sources Science and Technology, Volume 16, Number 2

Abstract (Nonlinear Plasma Dynamics in Captive Radio Frequency Discharge)

In capacitive radio frequency discharges operated at gas pressures below 20 mTorr two mechanisms of electron heating play a major role: i) ohmic heating due to collisions of electrons with neutrals of the background gas and ii) stochastic heating—often referred to as Fermi heating—due to momentum transferftom the oscillating boundary sheath. In this contribution we show that the plasma series resonance due to interaction of the plasma bulk and the nonlinear sheath significantly affects the electron heating. The series resonance can enhance both the ohmic and stochastic heating by factors of 2-5. We conclude that the nonlinear plasma dynamics has to be taken into account in order to describe quantitatively correct electron heating in low-pressure capacitive radio frequency discharges.

The ability to capture a 2-5 times gain in heat energy would be valuable, if it could be repeatedly preformed without electron run away consuming the Anode (also referred as the torch effect). To have a Plasma Reactor that can accommodate 300V and 40A without evoking the torch effect and producing 3 times the Faraday's law expected results would prove to be quite valuable! However, the technical problem that persisted for the longest time was that higher current caused a plasma arc to consume the anode in a relatively short period of time.

Solution to Problem

The design of the Toroid Anode which allows for this elevated level of electric current to be utilized without the consumption of the anode due to plasma arcing; involves electromagnetic confinement of the plasma utilizing a Spheromark which prevents the plasma from arcing to the anode and consuming it.

Advantageous Effects of Invention

The following is an excerpt from an Intertek Laboratories Report dated Nov. 8, 2010, which provides third party evidence that the technology tested, (which is the subject of this application) produced results of 303% above unity. This is well within the range reported in "Nonlinear plasma dynamics in capacitive radio frequency discharges".

BRIEF DESCRIPTION OF THE DRAWING

A specific construction of apparatus embodying the invention will now be described by way of example and with reference to the accompanying figures, which are a sectional view of part of the apparatus.

Figure 1:
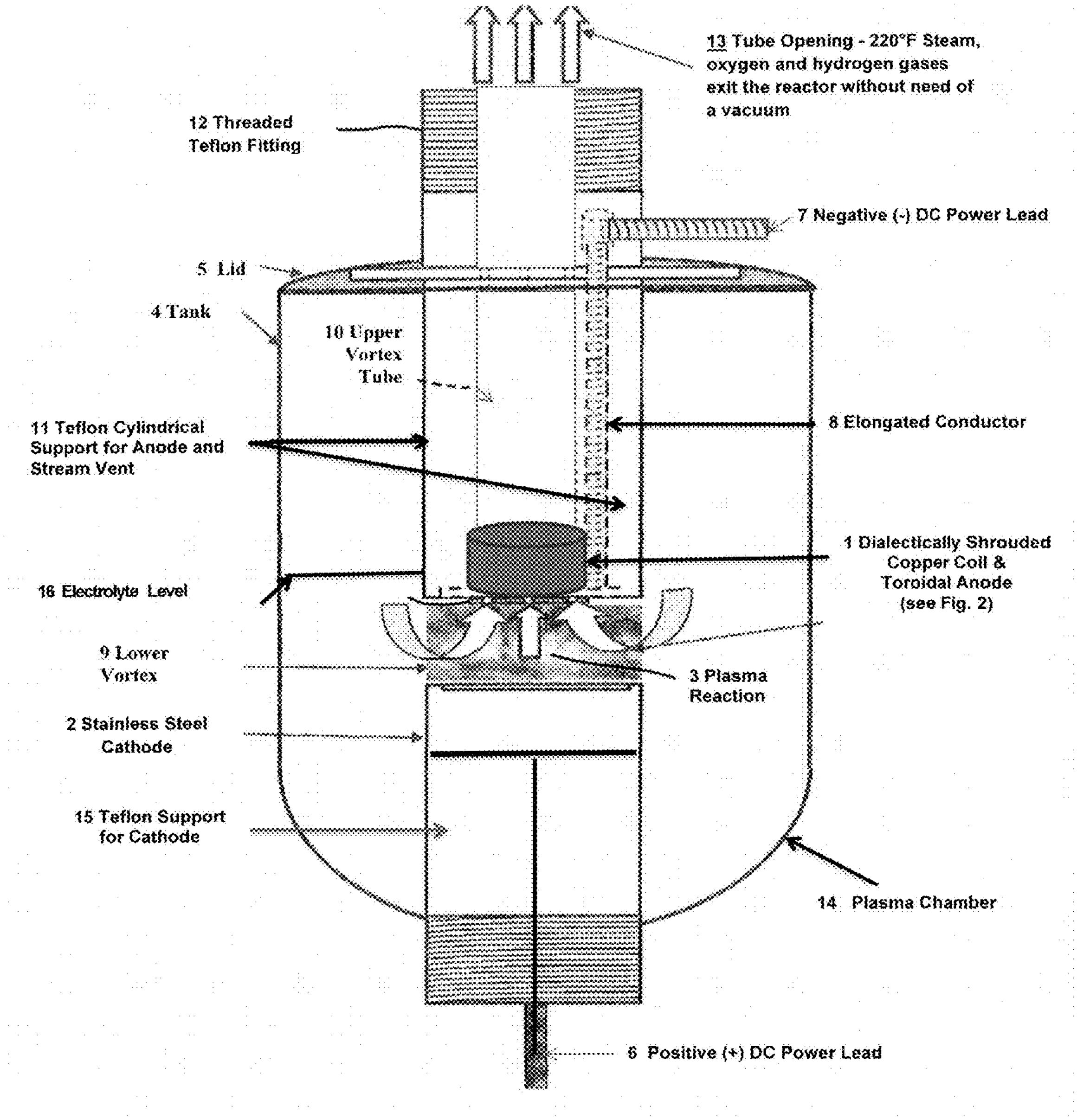
FIG. 1 is a sectional view of the Corona Plasma electrolytic cell. The positive power lead 6 connects to the stainless steel cathode 2 and the negative DC power lead connects to the Toroidal Anode 1 which is concentrically aligned and 50 mm apart from the cathode. Provide an electric potential and electrolyte, given all of the requirements and you have a plasma reaction taking place on the cathode. The byproduct of this high current plasma reaction is steam which must be vented. Heat rises, and from the formation of the steam at lower Vortex 9 due to the plasma reaction the steam passes through the Toroidal Anode 1 and through the 45 mm upper vortex tube 10 to exit at tube opening 13. Both electrodes are supported by dielectric Teflon machined to specifications. The cathode Teflon support 15 delivers the positive DC power lead to the cathode and provide spatially for the placement of the cathode. The cylindrical Teflon support for the anode 11 is more complicated and in fact consists of two parts the upper cylindrical support providing a passageway for steam and dialectically shrouding the upper coil edge of the anode. To shroud the lower edge of the anode a capping device is machined to provide a 10 mm dielectric shroud around the bottom of the anode coil and keep it positioned properly (see FIG. 3).
Figure 2:
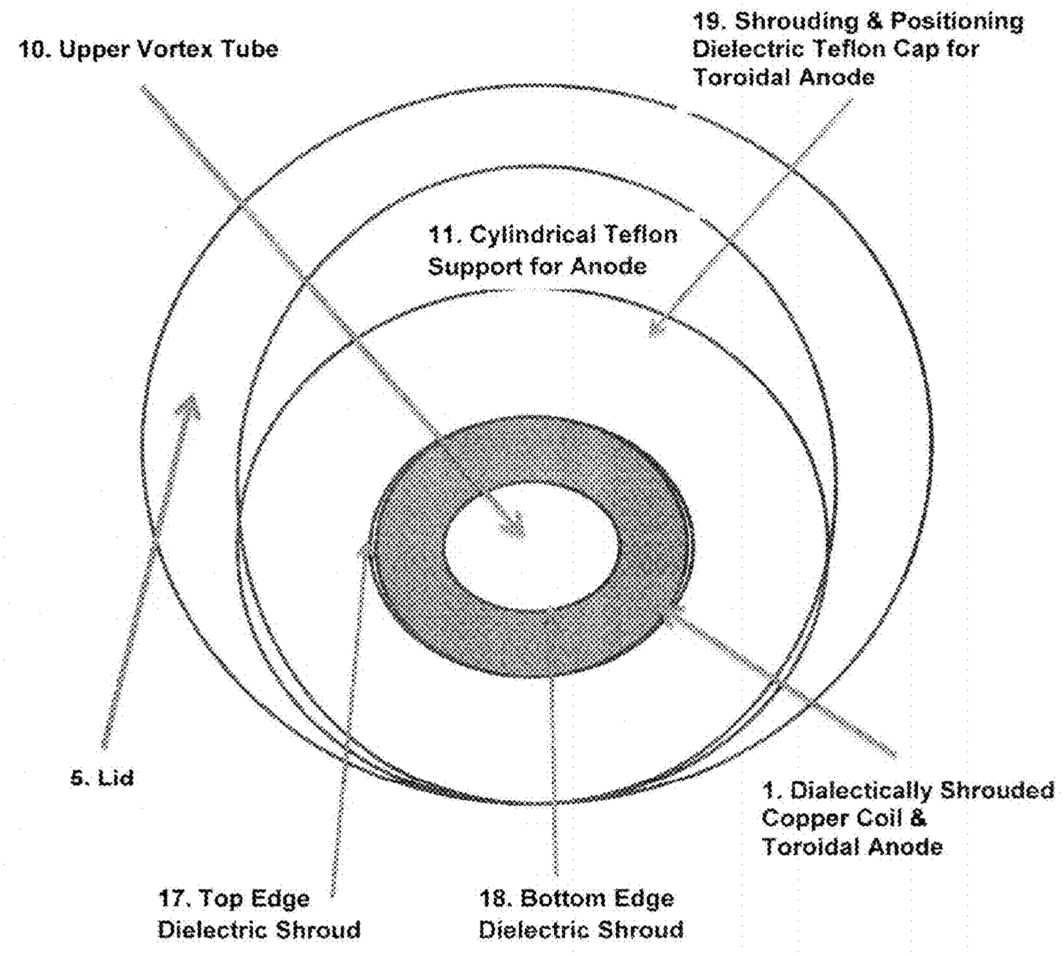
FIG. 2 is an internal view of the Toroidal Anode and the components that comprise it. The primary support for the anode is the lid 5 to the plasma chamber 13. To this the Teflon cylindrical support for the anode and steam passageway 11 is attached and extends through the top of the lid identified as 13 tube opening. The Toroidal Anode 1 has a diameter of 76 mm and is comprised of a copper coil 1, that is shrouded by 10 mm of dielectric Teflon along its top edge 17 and 18 its bottom edge. The upper Vortex tube 10 is the exhaust tube for the steam generated by the plasma reaction and exits the plasma chamber through the tube opening 13.
Figure 3:
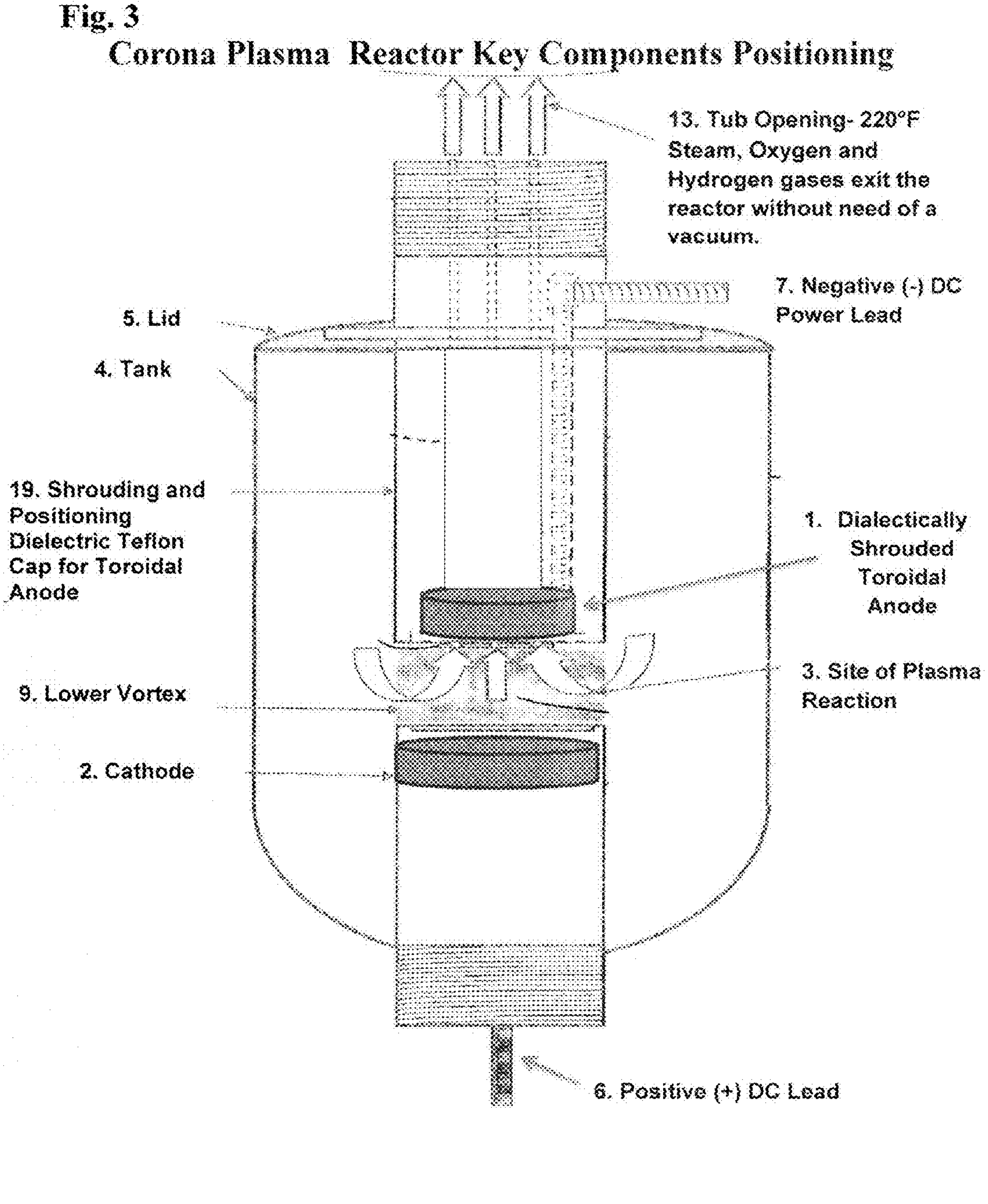
FIG. 3 illustrates key components positioning within the plasma chamber. The byproduct of the plasma reaction travels from the Lower Vortex 9 to the tube opening 13. The positive DC lead 6 is attached to the cathode 2 with a Teflon spacer in between. Inside the Teflon cap for the Toroidal Anode 2 the copper coil is shrouded top and bottom by 10 mm of dielectric Teflon. Between the anode and the cathode identified as the lower Vortex 9 the plasma reaction 3 takes place.

Phenomenological Description, Duration 10 Sec.

When an electrolyte solution inside the reactor was exposed to a sufficiently strong RF electromagnetic field, generally the following three phases could be observed. First, selective heating of the solution within the reactor, caused by the occurring high current densities, was observed. Subsequently, when local temperatures within the heated volume of the restriction reached the boiling point of the solution, water vapor bubbles were formed periodically with increasing frequency. Finally, after the establishment of the vapor bubble positioned in the vortex between the cathode and anode produced a continuous plasma discharge accompanied by a gas formation of molecular hydrogen and oxygen and Steam which is vented out the top of reactor in line and immediately above the anode. Finally there is the emission of a bright white light. A photograph of such a discharge obtained when using a K2CO3 solution with a concentration of 7 weight percent (wt %) is presented in Exhibit A Page 9.

The invention claimed is:

1. An electrolytic cell for the generation of a plasma field on an active surface of a plasma electrode in an electrolyte, the electrolytic cell comprising:

a vessel containing a liquid electrolyte, a first cylindrical body immersed in the electrolyte, a plasma electrode (cathode) immersed in the electrolyte, a second coil electrode, which is shrouded with dielectric material (anode) immersed in the electrolyte spaced from the plasma electrode, a power supply, and a circuit extending from the plasma electrode and the second electrode to the power supply and electrically connecting the plasma electrode, the second electrode, and the power supply;

the anode electrode being a toroidal body comprising an inner wall defining an opening extending through the body and comprising a first end, the first end is spatially concentric and perpendicular to the second electrode, at least a portion of the inner wall being disposed in contact with the electrolyte;

the anode electrode being shrouded with an electrical insulator comprising an inner wall defining an opening through a first tubular body, at least a portion of the inner wall of the first tubular body being disposed in contact with the electrolyte;

the plasma electrode being totally submerged in the electrolyte;

the said at least a portion of the inner wall of the first tubular body being adjacent to the said at least a portion of the inner wall of the anode electrode wherein the said wall portions cooperatively define a flow path extending there through that is surrounded by said wall portions.

2. The electrolytic cell of claim 1 wherein the Toroidal Anode as the key element of a plasma confinement system including means for generating a Spheromark.

3. The electrolytic cell of claim 2 wherein a Spheromark is generated, which electromagnetically confines the plasma, and prevents the migration of an electrical arc reaching the anode resulting in system failure, due to erosion of the anode.

4. The electrolytic cell of claim 3 further comprises anode means and cathode means comprising concentric annular members 76 mm in diameter and 50 mm apart, with the anode having a 10 mm dielectric shroud around the copper coil top and bottom.

5. The electrolytic cell of claim 1 wherein the plasma is formed by applying an electrical charge through the electrolyte by means of applying a potential difference across electrodes.

6. The electrolytic cell of claim 5 wherein a power supply for creating the potential difference is DC.

7. The electrolytic cell of claim 1 wherein gas is internally generated at the cathode to initiate and support the plasma state under sufficient electrical load, there are no provisions to provide for the addition of external gas to form plasma.

8. The electrolytic cell of claim 5 wherein approximately 12,000 W is applied to the system to initiate a plasma state.

9. A method for the generation of a plasma field in the electrolytic cell according to claim 1, wherein the electrolyte can be selected from potassium carbonate ($K_2CO_3$) or other suitable electrolyte such as Piperazine ($C_4H_{10}N_2$).

10. The method for the generation of a plasma field according to claim 9, wherein the generation of plasma is, carried out under atmospheric pressure.

11. The method for the generation of a plasma field according to claim 9, wherein the generation of plasma is carried out at room temperature.

12. The method for the generation of a plasma field according to claim 9, wherein a plasma glow discharge is generated at the cathode in the absence of a plasma arc.

13. The method for the generation of a plasma field according to claim 12, wherein, the plasma generated by the glow plasma discharge is classified as non-thermal plasma.

* * * * *